(12) United States Patent
Keller

(10) Patent No.: US 10,555,503 B2
(45) Date of Patent: Feb. 11, 2020

(54) ANIMAL CONTROL DEVICE

(71) Applicant: Lucas Keller, Mapleton, MN (US)

(72) Inventor: Lucas Keller, Mapleton, MN (US)

(73) Assignee: Lucas Keller, Mapleton, MN (US)

( * ) Notice: Subject to any disclaimer, the term of this patent is extended or adjusted under 35 U.S.C. 154(b) by 212 days.

(21) Appl. No.: 15/636,903

(22) Filed: Jun. 29, 2017

(65) Prior Publication Data

US 2018/0000050 A1 Jan. 4, 2018

Related U.S. Application Data

(60) Provisional application No. 62/356,113, filed on Jun. 29, 2016.

(51) Int. Cl.
*A01K 15/00* (2006.01)
*A01K 15/04* (2006.01)
*A01K 15/02* (2006.01)

(52) U.S. Cl.
CPC .............. *A01K 15/04* (2013.01); *A01K 15/02* (2013.01)

(58) Field of Classification Search
CPC .............................. A01K 15/02; A01K 15/04
See application file for complete search history.

(56) References Cited

U.S. PATENT DOCUMENTS

| | | | | |
|---|---|---|---|---|
| 2,981,465 | A * | 4/1961 | Bartel | F41B 15/04 231/7 |
| 4,394,956 | A * | 7/1983 | Andrews | A01K 15/029 231/7 |
| 4,667,431 | A * | 5/1987 | Mendicino | A01K 79/02 361/232 |
| D364,011 | S * | 11/1995 | Berg | D30/156 |
| 6,055,940 | A * | 5/2000 | Koehn | A01K 15/02 119/712 |
| 6,460,489 | B1 * | 10/2002 | O'Byrne | A01K 15/003 119/719 |
| 7,624,706 | B1 * | 12/2009 | Plekkenpol | A01K 15/003 119/840 |
| 2007/0167241 | A1 * | 7/2007 | Stethem | A01K 15/02 463/47.3 |

* cited by examiner

*Primary Examiner* — Monica L Williams
*Assistant Examiner* — Aaron M Rodziwicz
(74) *Attorney, Agent, or Firm* — Zarley Law Firm, PLC

(57) ABSTRACT

An animal control device having a stem with a gripping portion at one end and an electric prod head at the opposite end. Removably connected to the stem is a paddle body.

9 Claims, 3 Drawing Sheets

ANIMAL CONTROL DEVICE

CROSS REFERENCE TO RELATED APPLICATION

This application claims the benefit to Provisional Application U.S. Ser. No. 62/356,113 filed on Jun. 29, 2016.

BACKGROUND OF THE INVENTION

This invention is directed toward a device for controlling livestock and, more particularly, to a device having multiple means for controlling livestock.

Devices for controlling livestock are well-known in the art. As one example, electrical shock prods having a controlled voltage output are known as an efficient tool for moving and handling livestock. Within the last few years, limitations have been placed on where and how frequently an electric prod may be used which has created limitations.

Another known device is a sorting paddle. Typically, sorting paddles are used to control the movement of livestock in a pen, stall or chute. As an example, when moving pigs, a sorting paddle is used to prevent passage of piglets but to allow passage of mature pigs. While helpful, sorting paddles lack the necessary force needed to move an animal.

To use both is inconvenient, as an individual either does not have a free hand, or must repeatedly switch from one device to the other. Therefore, there is a need in the art for a device that addresses these deficiencies.

SUMMARY OF THE INVENTION

An animal control device having a stem with a gripping portion at one end and an electric prod head at the opposite end. The gripping portion has a button or switch that is electrically connected to the electric prod head.

Connected to the stem is a paddle body. The paddle body has a hollow chamber and a channel that extends through the chamber for receiving the stem. The hollow chamber has at least one subchamber for maintaining noisemakers.

DETAILED DESCRIPTION OF THE PREFERRED EMBODIMENT

Figure 1:
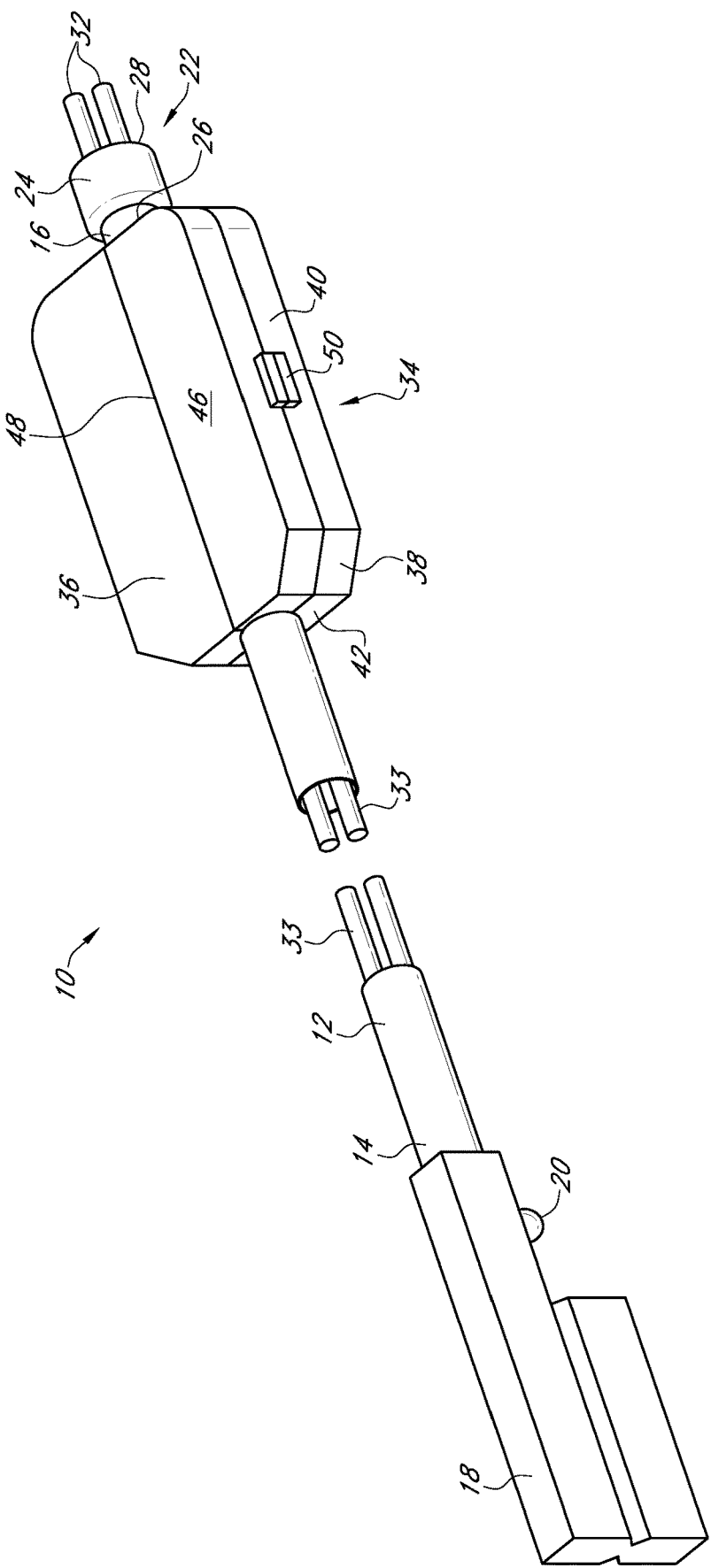
FIG. 1 is a perspective view of an animal control device.
Figure 2:
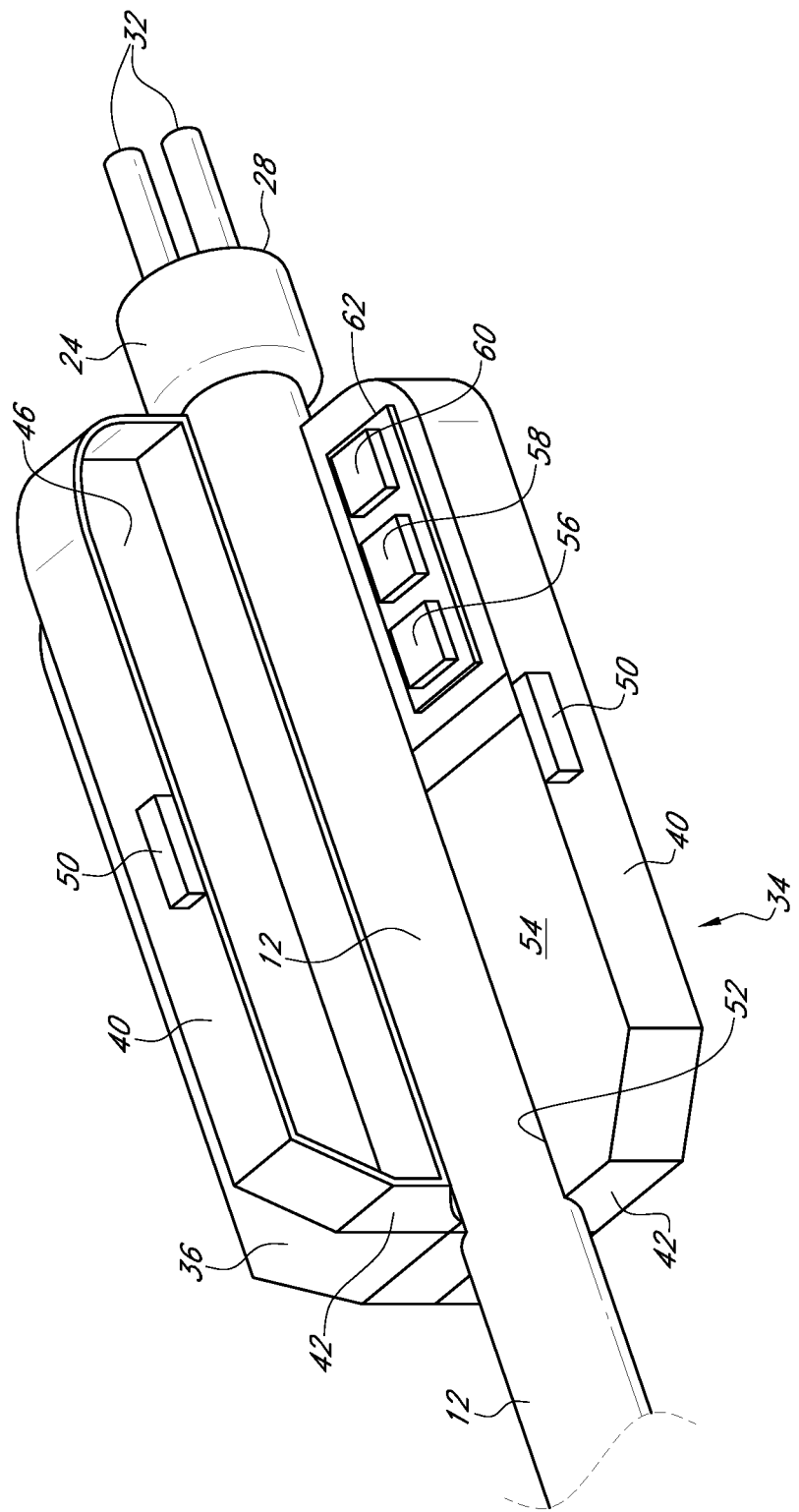
FIG. 2 is a partial perspective view of an animal control device.
Figure 3:
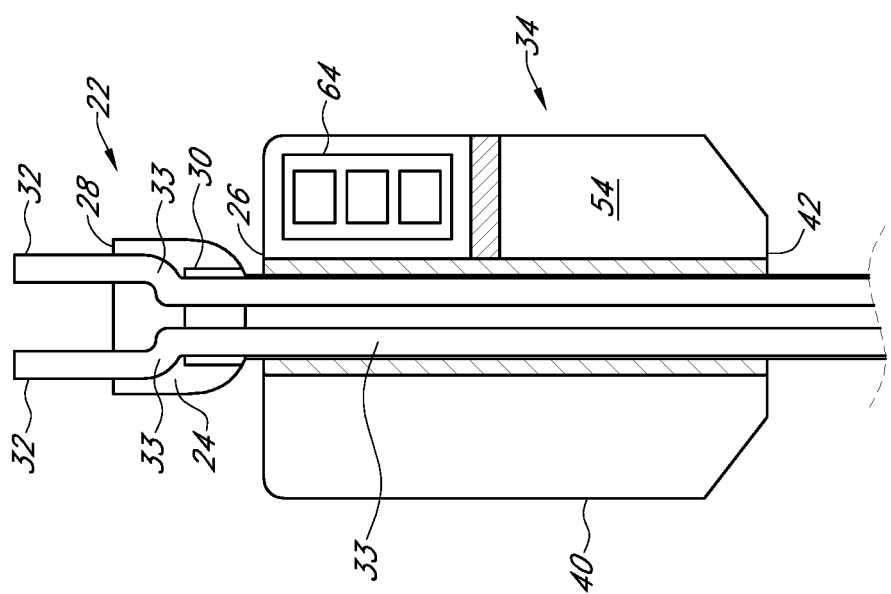
FIG. 3 is a partial top plan sectional view of an animal control device.

Referring to the figures, an animal control device 10 has a hollow stem 12 having a first end 14 and a second end 16. Attached to the first end 14 is a handle or gripping portion 18. Preferably, the gripping portion 18 is formed to comfortably receive an individual's hand. Extending through the gripping portion 18 is an activation button or switch 20.

Attached to the second end 16 of stem 12 is an electric prod head 22. The electric prod head 22 is of any size, shape, and structure. In one example, the prod head 22 has a tubular body 24 having a first end 26 and a second end 28. The first end 26 has a centrally located bore 30 that receives the second end 16 of stem 12. Extending outwardly from the second end 28 of body 24 are a pair of shocking electrodes 32. The shocking electrodes 32 are connected to leads 33 that extend through body 24 and into the hollow stem 12.

The hollow stem 12 extends through a paddle body 34 that is positioned between the gripping portion 18 and the electronic prod head 22 and, preferably, adjacent the electronic prod head 22. The paddle body 34 is of any size and shape and has a top wall 36, a bottom wall 38, a pair of side walls 40, and a pair of end walls 42 to form a hollow chamber 44. A flap or door 46 is formed from a portion of the top wall 36 that extends from a fold line or hinge 48 partially down end walls 42 to one of the side walls 40. The flap 46 is releasably attached to the bottom portion of the side wall 40 with a fastening member 50, such as, a clasp or snap fit. Alternatively, the paddle body 34 includes a top section and a bottom section that fit together.

Within hollow chamber 44 is a channel 52 that receives the hollow stem 12 and at least one subchamber 54 that receives noise making members, such as BB's and the like. The switch 20 is electrically connected to electrodes 32, such that when activated, high potential shocking current is provided to the electrodes. Electric current is provided in a number of ways. In one example, a battery or batteries 56, a voltage step-up transformer 58, and a vibrating member 60, all connected in a circuit 62, provides the electric current. The circuit 62 is connected to leads 33. The circuit is disposed within the handle 18, or alternatively, is disposed within a second subchamber 64 within the hollow chamber 44 of the paddle body 34.

In operation, the paddle body 34 is used to move, guide, direct, and separate livestock in a pen, stall, or chute. When additional force is needed, electrodes 32 are placed on the animal and button 20 is manually activated. By activating button 20, an electric circuit is completed allowing current from batteries 56 to travel through leads 22 to electrodes 32 providing a shock to the animal. Flap 46 provides access to hollow chamber 44 to replace batteries 56 and provide maintenance and repair.

What is claimed is:

1. An animal control device, comprising:
    a stem having a gripping portion at a first end and an electric prod head connected to a second end;
    a paddle body connected to a hollow stem between the gripping portion and the electric prod head; and
    a flap door formed from a portion of a top wall that extends from a fold line.

2. The device of claim 1 wherein the paddle body has a hollow chamber with a channel that extends through the hollow chamber and receives the stem.

3. The device of claim 1 wherein the paddle body has a hollow chamber with at least one subchamber.

4. The device of claim 1 wherein the paddle body has a first subchamber.

5. The device of claim 4 wherein the first subchamber contains noise making members.

6. The device of claim 4 wherein the paddle body has a second subchamber.

7. The device of claim 6 further comprising a circuit disposed within the second subchamber.

8. The device of claim 1 further comprising a circuit positioned within a hollow body of the paddle body, wherein the circuit has a vibrating member.

9. The device of claim 8 further comprising the circuit having a voltage step-up transformer.

* * * * *